Patented July 6, 1943

2,323,775

UNITED STATES PATENT OFFICE 2,323,775

VULCANIZATION OF RUBBER

Paul C. Jones and Roger A. Mathes, Akron, Ohio, assignors to The B. F. Goodrich Company, New York, N. Y., a corporation of New York No Drawing. Application February 8, 1939, Serial No. 255,356

6 Claims. (Cl. 260—787)

This invention relates to the vulcanization of rubber and to rubber compositions vulcanized in the presence of the accelerators herein described.

It has long been known that rubber may be vulcanized in reduced times in the presence of materials commonly called accelerators. It is an object of this invention to provide a new and effective class of accelerators. A further object is to produce accelerators having little tendency to cure rubber compositions at processing temperatures but which will produce vulcanizates having good tensile strength when heated at higher temperatures.

We have discovered that the products obtained by reacting approximately equimolar proportions of a 2-mercaptothiazoline and formaldehyde are excellent accelerators of vulcanization in the presence of a monocarboxylic acid or a metallic salt thereof.

Besides 2-mercaptothiazoline, which has the structural formula

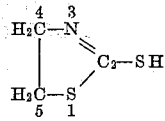

other 2-mercaptothiazolines wherein one or more of the hydrogens on the carbon atoms is replaced by hydrocarbon groups such as 2-mercapto 4-methylthiazoline; 2-mercapto 5-methylthiazoline; 2-mercapto 4-phenylthiazoline; 2-mercapto 4,4-ethylthiazoline; 2-mercapto 4,5-dimethylthiazoline; 2-mercapto 4,5-tetramethylenethiazoline; and other similar compounds may be reacted with formaldehyde to form useful accelerators.

The reaction between a 2-mercaptothiazoline and formaldehyde may be performed by simply heating the solid thiazoline with an aqueous formaldehyde solution. Although an excess of either reagent may be employed, the reaction occurs between equimolar proportions. Thus when solid 2-mercaptothiazoline is added to a water solution of an equimolar proportion of formaldehyde, the solid dissolves upon gentle heating and the derivative separates as a limpid oil in nearly quantitative yields. Though we do not wish to be bound thereby, it is our belief that the product is the hydroxymethyl ester of the 2-mercaptothiazoline. Regardless of its structure or the method by which it is made, the formaldehyde derivatives of the thiazolines are useful accelerators of vulcanization.

As a specific embodiment of our invention, a composition containing rubber 100 parts by weight, zinc oxide 5 parts, sulfur 3.5 parts, lauric acid 3 parts and 1 part of the oil obtained by reacting equimolar proportions of formaldehyde and 2-mercaptothiazoline was prepared. Vulcanization at varying times and temperatures produced compositions having the following characteristics:

| Time of cure in min. at 287° F. | Tensile strength at break | Ultimate elongation |
|---|---|---|
| | Lbs./in.² | Per cent |
| 30 | 4,070 | 755 |
| 60 | 3,890 | 660 |

In another embodiment of my invention, a composition containing rubber 100 parts by weight, zinc oxide 5 parts, sulfur 3.5 parts, stearic acid 1 part, and 1 part of the oil obtained by reacting equimolar proportions of formaldehyde and 2-mercaptothiazoline was prepared. Vulcanization at varying times and temperatures produced compositions having the following tensile strengths and elongations:

| Time of cure in min. at 240° F. | Tensile strength at break | Ultimate elongation |
|---|---|---|
| | Lbs./in.² | Per cent |
| 30 | (¹) | (¹) |
| 60 | 1,275 | 1,035 |
| 120 | 2,078 | 895 |

¹ No cure.

It will be observed that no cure developed in 30 minutes at 240° F. and that the composition was not fully cured in 120 minutes. Nevertheless it cures rapidly at normal vulcanizing temperatures. This delayed action at low temperatures is a valuable property of the accelerators of this invention.

Any of the saturated or unsaturated monocarboxylic acids such as caprylic, palmitic, oleic, ricinoleic, benzoic, salicylic, toluic, or other like acids or their salts with metals such as lead, tin, sodium, cobalt, nickel, calcium, magnesium, and other alkali, alkaline earth, and heavy metals may be employed in place of the materials used in the specific examples. While the lower fatty acids may be employed if desired, it is preferable to employ their metallic salts, zinc acetate for instance, which are solids. The acids or their metallic salts may be present in any desired proportions, even small amounts usually having a beneficial effect. For the best results however, they should be included in the compositions in amounts varying from 1 to 5% or more.

It is a remarkable and unusual property of the materials of this invention that they are activated by such materials as benzoic acid and salicylic acid which are widely used retarders for other accelerators. This unexpected result indicates that mercaptothiazolines possess properties not shared by other accelerators of vulcanization.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the presence of the accelerators herein described. The accelerator may be incorporated in the rubber by mastication, milling or any similar process, or in the case of latex, rubber cement, or any other natural or artificial dispersion or solution of rubber by simply dissolving or suspending the accelerator therein.

The vulcanization may be performed in other manners than that particularly set forth in the specific examples; specifically, rubber compositions may be heated in the presence of sulfur or selenium in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, other accelerators, etc., but not including materials incapable of vulcanization by reaction with sulfur.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claims.

We claim:

1. The process which comprises vulcanizing a rubber in the presence of a member of the class consisting of monocarboxylic acids and their metallic salts and a compound obtained by reacting approximately equimolar proportions of a 2-mercaptothiazoline and formaldehyde.

2. The process which comprises vulcanizing a rubber in the presence of a member of the class consisting of monocarboxylic acids and their metallic salts and a compound obtained by reacting approximately equimolar proportions of 2-mercaptothiazoline and formaldehyde.

3. The process which comprises vulcanizing a rubber in the presence of a fatty acid and a compound obtained by reacting approximately equimolar proportions of 2-mercaptothiazoline and formaldehyde.

4. A rubber composition comprising a rubber which has been vulcanized in the presence of a member of the class consisting of monocarboxylic acids and their metallic salts and a compound obtained by reacting approximately equimolar proportions of a 2-mercaptothiazoline and formaldehyde.

5. A rubber composition comprising a rubber which has been vulcanized in the presence of a member of the class consisting of monocarboxylic acids and their metallic salts and a compound obtained by reacting approximately equimolar proportions of 2-mercaptothiazoline and formaldehyde.

6. A rubber composition comprising a rubber which has been vulcanized in the presence of a fatty acid and a compound obtained by reacting approximately equimolar proportions of 2-mercaptothiazoline and formaldehyde.

PAUL C. JONES.
ROGER A. MATHES.

CERTIFICATE OF CORRECTION.

Patent No. 2,323,775.  July 6, 1943.

PAUL C JONES, ET AL.

It is hereby certified that error appears in the printed specification of the above numbered patent requiring correction as follows: Page 1, first column, line 24, for that portion of the formula reading "$C_2$—SH" read --$C^2$—SH--; line 31-32, for "4,4-ethylthiazoline" read --4,4-diethylthiazoline--; and that the said Letters Patent should be read with this correction therein that the same may conform to the record of the case in the Patent Office.

Signed and sealed this 19th day of October, A. D. 1943.

(Seal)

Henry Van Arsdale,
Acting Commissioner of Patents.